Feb. 17, 1953 P. M. GARNIER 2,628,483
REFRIGERATION OF FISH
Filed Aug. 9, 1950 2 SHEETS—SHEET 1

INVENTOR
PIERRE MAURICE GARNIER
By EJ Freeman
ATTORNEY.

Feb. 17, 1953  P. M. GARNIER  2,628,483
REFRIGERATION OF FISH

Filed Aug. 9, 1950  2 SHEETS—SHEET 2

INVENTOR
PIERRE MAURICE GARNIER
BY E. Freeman
ATTORNEY.

Patented Feb. 17, 1953

2,628,483

UNITED STATES PATENT OFFICE 2,628,483

REFRIGERATION OF FISH

Pierre Maurice Garnier, Vertou, France

Application August 9, 1950, Serial No. 178,431
In France June 26, 1950

6 Claims. (Cl. 62—104)

This invention relates to methods of refrigerating and handling sardines and similar fish. The invention further relates to plant and apparatus for carrying said methods into effect.

It is a recognized fact that sardines are one of the, if not the, most difficult cannable fish to handle if it is desired to keep them in a proper state of freshness from the time the fish are extracted from the ocean to that at which they can be subjected to the first of the various processing treatments preceding their actual canning. Sardines are in fact so perishable that within a few hours, especially in hot weather, their flesh reddens and becomes pungent and the skin gets damaged on the least manipulation.

In attempting to overcome these serious difficulties, the least unsatisfactory method available heretofore consisted of placing the sardines, aboard the sardine boats, into small boxes each adapted to contain only a small number of fish in a shallow layer. However, this procedure is slow and cannot usually be carried out directly after the catch has been hauled in from the water. As a result, and no matter how diligent the crew of the sardine-boat, the catch, before its being put away in the said boxes, has always to remain a more or less great length of time in enclosures provided on the deck of the sardine-boat, and during this time the sardines begin to go bad. The deterioration which thus sets in within the enclosures thereafter proceeds at a very rapid rate, even if the boxes once filled are put in cold storage, so that, within a few hours, a high-grade sardine may be converted to a second-class one.

Another objectionable consequence of the poor keeping characteristics of sardines from the time at which they are caught and that at which they reach the curing or processing plant, is that, as soon as the sardines have reached the sardine plant, the entire personnel of the plant must at once be put to work on cutting the heads off the said sardines, followed by the further treatments, cooking inclusive, which precede the canning operations and then return to the head-cutting operation as soon as a fresh load of newly-caught fish is delivered. It will be understood that such a working schedule makes for poor efficiency, and leads to a substantial increase in the cost price of the canned goods.

It is the main object of this invention to provide a process of refrigeration adapted to be operated with equal proficiency both on board the fishing boats in order to bring back the catch of fish in perfect condition to harbour, regardless of the temperature and the duration of the return trip of the boat, and also on land, to maintain said fish in a perfectly preserved condition until such time as it can be processed in the curing and packing plant or delivered to the consumer, in the case of sardines sold fresh.

Aside from the fact that the method of the invention eliminates deterioration of the sardines from the time they are caught to the time they reach the curing plant, it further possesses an essential advantage in that it makes possible the adoption, in the fish-canning industry, of continuous working methods, i. e. methods wherein the plant workers may be divided into several specialized shifts or gangs of which is assigned a definite operation (head-cutting, cooking, canning, etc.). The advantages of such method of work will include reduction in the cost of labor for a given production, and more especially reduction in the necessary plant equipment for canning a given output of fish.

The method of the invention is chiefly characterised in that it consists of dumping the fish, directly on their extraction from the water, in one or more tanks through which a refrigerating or cooling medium at a temperature of about 0° C. is caused to flow, allowing the fish to reach substantially the same temperature as that of the cooling medium in the tanks, and then discharging the cooled fish into a storage enclosure, preferably refrigerated.

The plant according to the invention for working the method just defined may comprise at least one tank provided with a perforate false-bottom and means for circulating through said tank a cooling medium, and a discharge conduit leading from the bottom of the tank to discharge the cooled fish into a storage enclosure.

The above and further objects, features and advantages of the invention will appear as the description proceeds. The accompanying drawings illustrate one specific embodiment of sardine cooling plant according to the invention, given by way of illustration and not of limitation. In the drawings.

As already stated, the method of the invention essentially comprises dumping the sardines as with a scoop or spoon-net of suitable size, as soon as the fish have been extracted from the fishing-net, into a tank provided with heat isolation and through which a cooling medium at a temperature of about 0° C. is caused to flow. Preferably the cooling medium is delivered into the bottom of the tank so as to flow upwardly through it.

As more specifically described hereinafter, the tank is, accordingly to a feature of the invention, so designed as to define at its base a free space for the purpose of allowing the cooling medium to diffuse as uniformly as possible below the mass of fish contained in a more or less floating condition in the tank.

After the sardines dumped into the tank have been brought to a temperature approximating that of the cooling medium circulated continuously through the tank, the discharge of cooling medium into the tank is first cut off, then the cooling medium contained in the tank is discharged from it and the cooled sardines are extracted from the tank and placed into a storage enclosure. Preferably the cooled sardines are then placed in boxes as in the known procedure mentioned in the preamble.

Since the sardines have preferably to be cooled as soon as they have been hauled in from the ocean and consequently the method of the invention has to be operated on board the sardine-boat itself, it will obviously be desirable to use sea-water as the cooling medium, though obviously there is nothing to prevent the use of cooling brine. It will be noted however, that in addition to the obvious economy achieved by the use of sea-water, since proceeding in this way averts the necessity of using salt for preparing the brine and of loading a comparatively large amount of fresh water on board the sardine-boats, the use of sea-water as the cooling medium has a further advantage in that sardines do not float in sea-water, so that they drop to the bottom of the tanks, thus coming closer to the inlet of cooling medium into the tanks, and promoting a quick cooling action.

Figure 1:
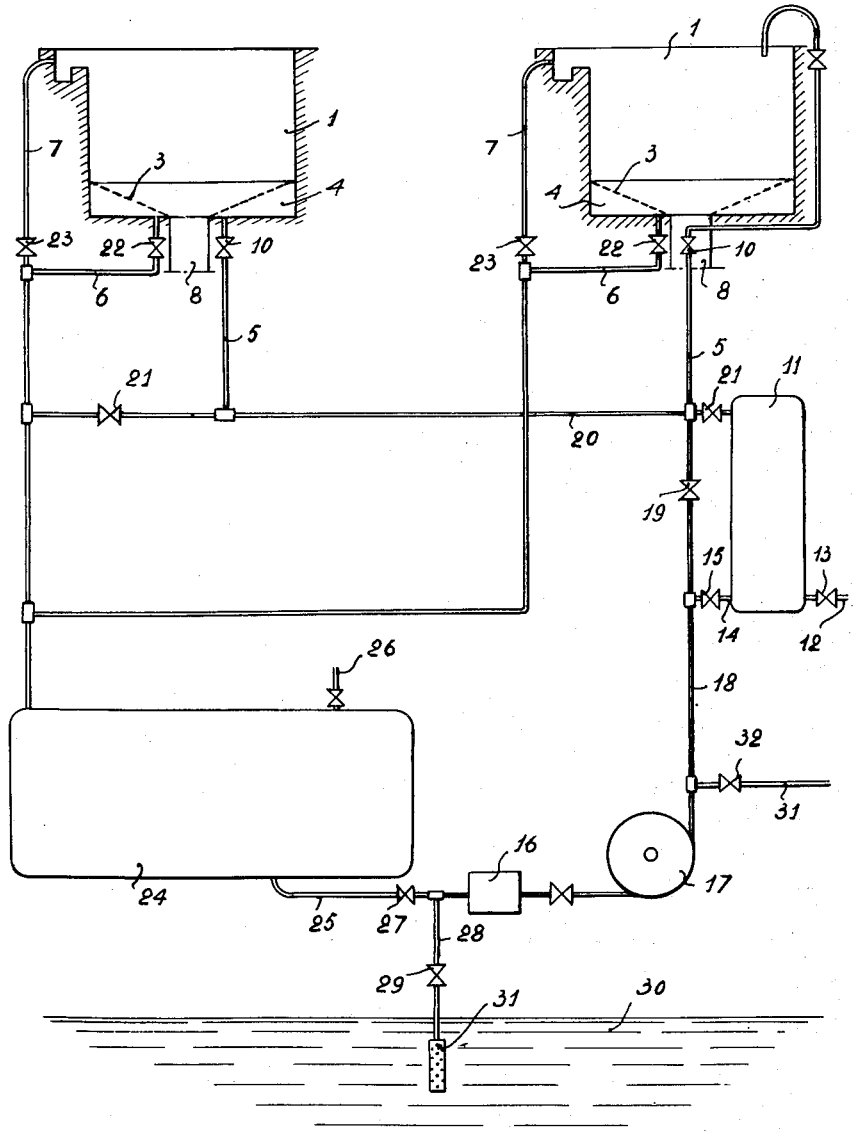
Fig. 1 is a flow-sheet diagram of a plant as provided aboard a sardine-boat for working the method of the invention.
Figure 2:
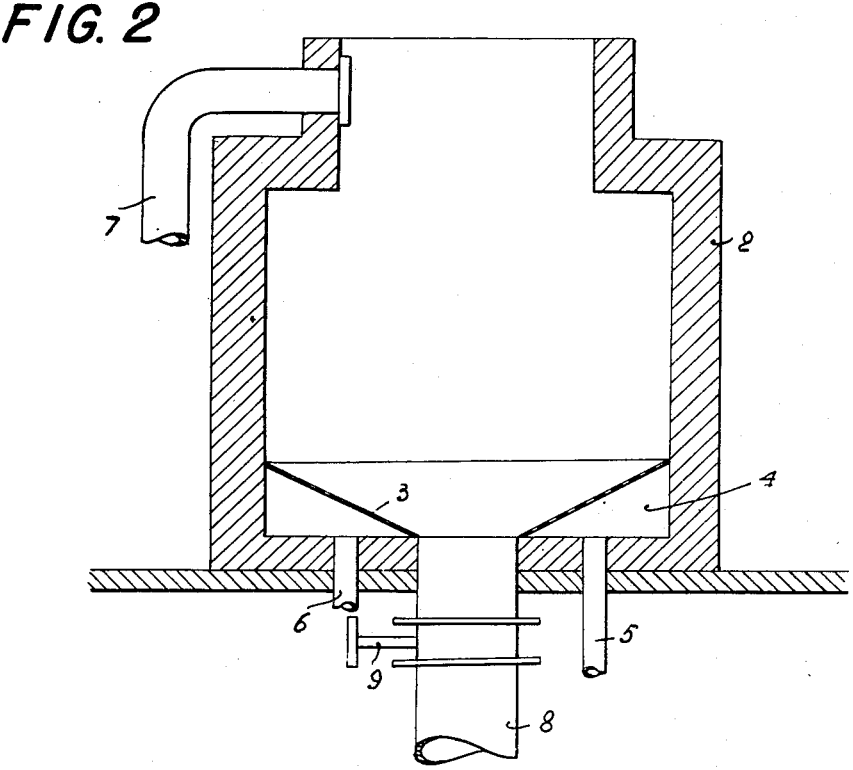
Fig. 2 is a detail view in vertical section and elevation of one of the tanks included in the plant of Fig. 1.
Figure 3:
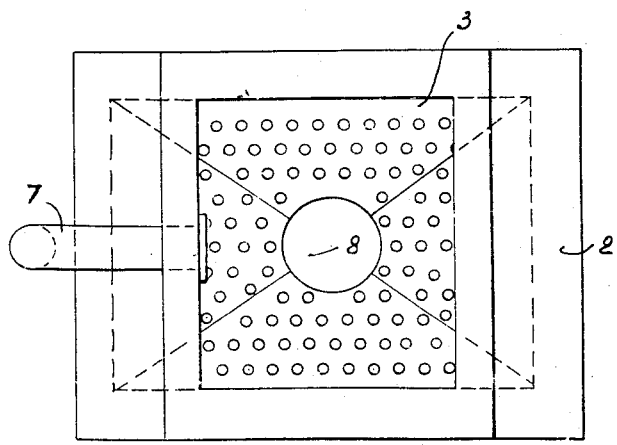
Fig. 3 is a plan view corresponding to that of Fig. 2.

To carry out the method described aboard a sardine-boat, a plant may be used similar to that diagrammatically illustrated in Fig. 1, and comprising for example a pair of tanks 1 each formed, as more particularly illustrated in Figs. 2 and 3, with heat-isolated walls 2 and provided with a perforate false-bottom 3 of a frusto-conical or funnel-like form. In this way a space 4 is defined underneath the bottom of the tank 2 into which space on inlet pipe 5 opens for the intake of cooling medium. From the space 4 leads an outlet pipe 6 for discharging the spent cooling medium and an overflow pipe 7 is further provided at the top of the tank.

For discharging the cooled sardines from the tank a discharge conduit 8 is provided, and a plug or gate valve 9 is interposed in the discharge conduit 8 as shown.

The outlet pipes 5 from both tanks 1, each controlled by a related valve 10, are connected with a refrigerator 11. The refrigerator unit 11 is supplied through a line 12 controlled by a valve 13 with a suitable cold fluid from a cold-generating unit (not shown) and is supplied through a line 14 controlled by a valve 15 with cooling medium which is to be discharged into the tanks 1.

The cooling medium, preferably comprising ocean water, is drawn in through a strainer 16 by a pump 17 which discharges it over a line 18 controlled by a valve 19 into the refrigerator 11. The cooling medium, cooled in the refrigerator 11 is thence delivered over a line 20 provided with two valves 21, and from the line 20 the two input pipes 5 branch off leading to the tanks 1.

The outlet pipes 6 each provided with its valve 22 are both connected with the related overflow pipes 7 each provided with its valve 23. The pipes 7 lead to a buffer tank 24 (at least equal in capacity to the combined tanks 1) and the buffer tank 24 is connected through a line 25 with the pump 17; the tank 24 is further provided with a drain cock 26.

Interposed on the line 25 is a check valve 27. Branching off from the line 25 between the valve 27 and the strainer 16 is a line 28 which is provided with a valve 29, the lower end of said line 28 dipping into the ocean and being provided with a strainer 31.

The plant further comprises a discharge pipe 33 delivering overboard branching off from the line 18 and provided with a valve 32, and finally strainers—not shown—may be interposed along the respective pipes 6 and 7 for separating the fish-scales.

The operation of the above described plant will now be explained, it being assumed that the buffer tank 24 is filled with sea-water, the valve 27 is open, the valves 13, 15, 21, 10 and 23 likewise open and the valves 29, 32, 19, 22 and 21 are closed.

With the pump in action, the water from the tank 24 flows through the refrigerator 11 and enters at a temperature of approximately 0° C. into the space 4 at the bottom of each tank 1. This cooled water flows through the perforate false-bottom 3 and rises up in each tank, into which the sardines are dumped as they are hauled aboard. As the water reaches the upper level of the tank it is recycled through the overflow pipes 7 to the buffer tank 24 from which it is pumped by the pump 17.

Thus a continuous upward current of cooled sea-water is set up through the tanks 1, this operation being continued for as long as it may take the sardines dumped into the tanks to be brought to a temperature approximating 0° C. When this temperature has been about reached throughout the mass of fish, the pump 17 is stopped, the valves 10 are closed and the valves 22 opened, so that the tanks 1 may be purged of the sea-water contained therein. After this purging step it only remains to open the plug or gate valve 9 in order to discharge the refrigerated sardines from the tanks 1 through the discharge conduits 8.

Where the tanks 1, as in the preferred embodiment, rest on the deck of a sardine-boat, the conduits 8 may deliver directly into the cooled hold of the boat, in which the sardines may be kept in bulk condition until unloaded in harbour, or alternatively they may be packed in boxes as in the known procedure.

It will be understood that the above described operative cycle will be repeated as many times as may be necessary to cool to the desired temperature the entire haul of fish.

The method and plant of the invention make it possible to deliver the sardines to the factory in a state of freshness comparable to that which they possessed in their extraction from the ocean. As a result it becomes possible in the canning factory to adopt a method of continuous operation for effecting the various sardine-processing steps, such that said various steps to which the fish have to be subjected prior to their actual canning may be accomplished uninterruptedly by separate groups of workers each specialized in a given task.

While it is preferable that the cooling medium be admitted into the tanks through the base thereof, it is quite practicable, as indicated by way of example in connection with the tank 1 at the right of Fig. 1, to add the cooling medium into the tank by pouring it through the top thereof. In such a case, the overflow line 7 becomes practically superfluous, as the cooling medium may be directly recycled through the outlet discharge pipe 6 into the buffer tank 24 after having flowed through the perforate false-bottom 3.

In the same way, instead of providing special tanks 1, it lies within the scope of the invention to use as the cooling tanks in the above described method, each of the separate compartments of the ship's hold, the cooling medium then being discharged, after having served to fully cool the sardines into a empty space provided below a perforate false-bottom, in order to ensure that the sardines are stored high and dry.

It will also be distinctly understood that a plant generally similar to that described hereinabove may be installed on land, for treating the cardines as described as soon as they have been brought into harbour. It could further be used for the purpose of temporarily storing the cardines, whether the latter have or have not already been treated by the process of the invention on board.

It must finally be understood that the details of apparatus illustrated and described have been given in a purely illustrative sense, and that various modifications in detail may be made therein and in the steps of the process without exceeding the scope of the invention as defined in the appended claims.

What I claim is:

1. Cooling tank for provisionally cooling freshly-caught fish which comprises, a heat-isolated container, a substantially funnel-shaped perforate wall disposed in the bottom of said container and defining an annular space in said container beneath said wall, a large sectioned fish-discharge outlet leading from the centre of the bottom of said container and constituting the neck of said funnel, valve means in said fish-discharge outlet, inlet and outlet means for a cooling fluid into and out of said container in said annular space thereof, and overflow means at the top of said container.

2. Provisional cooling plant for freshly-caught fish which comprises at least one tank, perforate means near the base of said tank traversable by liquid but not traversable by fish defining an upper compartment for fish and a lower compartment free from fish in said tank, sealable gravity discharge means for fish from said upper compartment, a buffer tank at least equal in capacity to the combined capacity of said at least one tank, a refrigerator means, and hydraulic circuit means for circulating a coolant fluid from said buffer tank through said refrigerator means into said lower tank compartments, and both from said lower compartments and from the overflow of said tanks to said buffer tank.

3. Plant as in claim 2 as provided on board a fishing-boat, wherein said gravity-discharge means for fish from said upper tank compartment delivers into the hold.

4. Plant as in claim 3 wherein means are provided for pumping additional water from the sea into said refrigerator means.

5. Provisional fish-cooling plant which comprises in combination, a set of cooling tanks, perforate means in each said tank defining an upper compartment for fish and a lower compartment free from fish, a sealable gravity-discharge means for fish leading down from said upper compartments out of said tanks, overflow means at the top of each tank, inlet means into each tank and outlet means from the lower compartment of each tank, a buffer tank at least equal in capacity to the combined capacity of said tanks, a refrigerator, a pump and hydraulic and valve means for pumping liquid from said buffer through said refrigerator to all of said inlet means in parallel, and back from the combined outlet and overflow means of all said tanks in parallel to said buffer tank.

6. Plant as in claim 5 wherein said inlet means delivers into the top of said upper compartment of its related tank.

PIERRE MAURICE GARNIER.

REFERENCES CITED

The following references are of record in the file of this patent:

UNITED STATES PATENTS

| Number | Name | Date |
| --- | --- | --- |
| 1,791,023 | Dahl et al. | Feb. 3, 1931 |
| 1,798,781 | Brooks | Mar. 31, 1931 |
| 1,912,896 | Hiller | June 6, 1933 |
| 2,184,954 | Conn | Dec. 26, 1939 |
| 2,200,331 | Fisher | May 14, 1940 |

FOREIGN PATENTS

| Number | Country | Date |
| --- | --- | --- |
| 269,574 | Great Britain | Dec. 15, 1927 |
| 285,195 | Italy | May 4, 1931 |